United States Patent
Melia

(10) Patent No.: US 8,718,453 B2
(45) Date of Patent: May 6, 2014

(54) METHOD FOR READING CONTENT ON A MULTIMEDIA DEVICE, AND ASSOCIATED DEVICE

(75) Inventor: Pierre Melia, Paris (FR)

(73) Assignee: Sagemcom Broadband SAS, Reuil Malmaison (FR)

( * ) Notice: Subject to any disclaimer, the term of this patent is extended or adjusted under 35 U.S.C. 154(b) by 113 days.

(21) Appl. No.: 13/393,535

(22) PCT Filed: Sep. 1, 2010

(86) PCT No.: PCT/EP2010/062786
§ 371 (c)(1),
(2), (4) Date: May 14, 2012

(87) PCT Pub. No.: WO2011/026855
PCT Pub. Date: Mar. 10, 2011

(65) Prior Publication Data
US 2012/0230648 A1 Sep. 13, 2012

(30) Foreign Application Priority Data
Sep. 2, 2009 (FR) ...................................... 09 55976

(51) Int. Cl.
*H04N 5/783* (2006.01)

(52) U.S. Cl.
USPC .......................................... 386/343; 386/344

(58) Field of Classification Search
None
See application file for complete search history.

(56) References Cited

U.S. PATENT DOCUMENTS

| 5,675,693 A | 10/1997 | Kagoshima |
| 2008/0263605 A1 | 10/2008 | Mine et al. |

FOREIGN PATENT DOCUMENTS

JP 2008078755 4/2008

*Primary Examiner* — William C Vaughn, Jr.
*Assistant Examiner* — Asher Khan
(74) *Attorney, Agent, or Firm* — Blakely Sokoloff Taylor & Zafman

(57) ABSTRACT

The invention relates to a method for reading content (1) on a multimedia device comprising a content reader, the reader also enabling the video display of the content and the navigation within the content, the content containing images I to be displayed during navigation, the method comprising, when the reader receives a navigation command given by a user, the steps in which the reader: positions (S5) the reading within the content on the basis of the received command; reads only the images I and displays (S6) an image I in accordance with the reading position; stops the reading of the content after said image In is displayed and continuously displays said image (S7); calculates the mean time tin for positioning (S5) the reading in the content and for displaying (S6) the image I; waiting for a period $t_{wait}$ that is proportional to the mean time tin before verifying if a navigation command is still given by the user. The invention also relates to a device for implementing the method.

18 Claims, 4 Drawing Sheets

METHOD FOR READING CONTENT ON A MULTIMEDIA DEVICE, AND ASSOCIATED DEVICE

This is a non-provisional application claiming the benefit of International Application Number PCT/EP2010/062786 filed Sep. 1, 2010.

GENERAL TECHNICAL FIELD

The present invention concerns a method of reading content on a multimedia device comprising a content reader.

It also concerns a device for implementing the method.

PRIOR ART

The great increase in the number of multimedia devices (portable/fixed) containing and/or listing contents (audio/video) requires the implementation of readers enabling a user to navigate (also referred to as "trick mode" in English terminology) in these contents, while enabling him to view the current position of the navigation in the content, such as for example during fast forward or fast rewind.

However, continuous reading of the content during navigation, in fast forward for example, gives rise to excessive consumption of resources of the central unit and of the reader of the device, compared with reading at normal speed.

In the case where the content is read from a server or a medium remote from the device on a network, continuous reading of the content during navigation, in fast forward for example, give rise to an overloading of the network.

It is for these two reasons that in general a method used for navigation at high speed (×32, ×64 for example) consists of displaying only certain images of the content. The images displayed in navigation are the I images, also referred to as "intra" images, which are completely independent of the other images normally read, and are in general coded, in JPEG (Joint Photographic Experts Group) format for example.

This method is in fact less expensive with regard to the use of the resources of the device and/or the load on the network but requires an effective reading method in order to have a display of I images at regular intervals, so that the user has an impression of fluidity.

Decoding boxes (also referred to as Set Top Boxes (STBs) or Personal Video Recorders (PVRs) or Digital Video Recorders (DVRs)) are for example known using such, such reading methods.

According to the known reading methods, when the reader receives a navigation instruction given by a user, he positions the reading in the content according to the instruction received, and displays a first I image according to the reading position. The reader then stops the reading of the content after display of said first I image and effects a continuous display of said first image. And so on.

If the time taken both for positioning the reading of the content and for display of the first I image less than the reference time $t_{ref}$ (in general fixed at 250 ms and corresponding substantially to the period of display of the I images), the display of the successive I images is regular, at intervals of times substantially equal to $t_{ref}$.

On the other hand, if the time for positioning the reading in the content and display of the first I image is greater than $t_{ref}$, the reader keeps the display of the current I image and displays only the next I image the position and display time of which is less than $t_{ref}$. The display then risks being jerky.

The reading methods currently implemented are in general of good quality for a specific type of content stored on a memory of the multimedia device since the reference time $t_{ref}$ is well sized for this type of content. They are thus of good quality for reading contents in a format compatible with digital video broadcasting from a hard disk of the device. Such reading methods are known from U.S. Pat. No. 5,675,693 and US 2008/0263605.

The above reading methods do however have drawbacks.

They are in fact of less quality when they are used for contents other than DVB, for example contents to the .mov, .avi, .mp4, etc. formats.

They are also of less quality when they are used for a content read from a remote server (of the "http" type for example) and when the bandwidth on the network is small.

This is because the reference time $t_{ref}$ known is not sized so that the display of I images is sufficiently frequent and non-jerky for contents other than DVB and/or remote contents.

The reference time $t_{ref}$ is in general too short, which means that the frequency of display of the I images depends on each I image, and is no longer linked to $t_{ref}$. The display is therefore in general jerky. In addition, the I images risk being displayed too rapidly, which is not pleasant for the user, who will then not have the time to see the current position in the content.

A method according to the preamble of claim 1, in which a content reader calculates a mean display time for the I images, is also known from JP 2008 078755. However, this mean display time is used for optimising a calculation of a search distance for positioning in the content. In the method of JP 2008 078755, the reader positions itself directly and continuously in the content according to a navigation instruction and the search distance thus calculated, in order to increase the frequency of display of the I images, which is not pleasant for the user, who will not then have the time to see the current position in the content.

One solution is then to increase $t_{ref}$, but then the frequency of display of the I images is in general too small.

PRESENTATION OF THE INVENTION

The invention proposes to mitigate at least one of these drawbacks.

For this purpose, a reading method according to claim 1 is proposed.

The invention is advantageously completed by the features of the dependent method claims 2 to 7.

The invention also concerns a device for implementing the method.

The invention has many advantages.

The waiting time $t_{wait}$ after the display of each I image, being proportional to a dynamic mean of the times for positioning and displaying the I images in navigation, is neither too short nor too long.

Consequently the I images are displayed neither in a jerky fashion nor too rapidly or too slowly. The user therefore has the time to see the current position in the content.

Because the waiting time is proportional to a mean of the positioning and display times for the I images, the longer the user remains in navigation mode on the same content, the more regular will be the display of the I images.

The reference time $t_{ref}$ is proportional to the mean display time tm and is expressed as follows:

$$t_{ref} = k \cdot tm$$

If the display takes place from an http server for example, and the bandwidth of the network varies abruptly, then the reader will adapt to these variations, progressively.

The method can be used for contents of all types of DVB formats of course, but also for example to the .mov, .avi, .mp4 (H264), MPEG2, WMA and Divx formats.

The method can be used for contents stored on a memory of the multimedia device (hard disk, USB key), but also a remote server (for example an http server).

PRESENTATION OF THE FIGURES

Other features, aims and advantages of the invention will emerge from the following description, which is purely illustrative and non-limitative, and must be read with regard to the accompanying drawings, in which.

In all the figures, the similar elements bear identical reference numbers.

DETAIL DESCRIPTION

Figure 1:
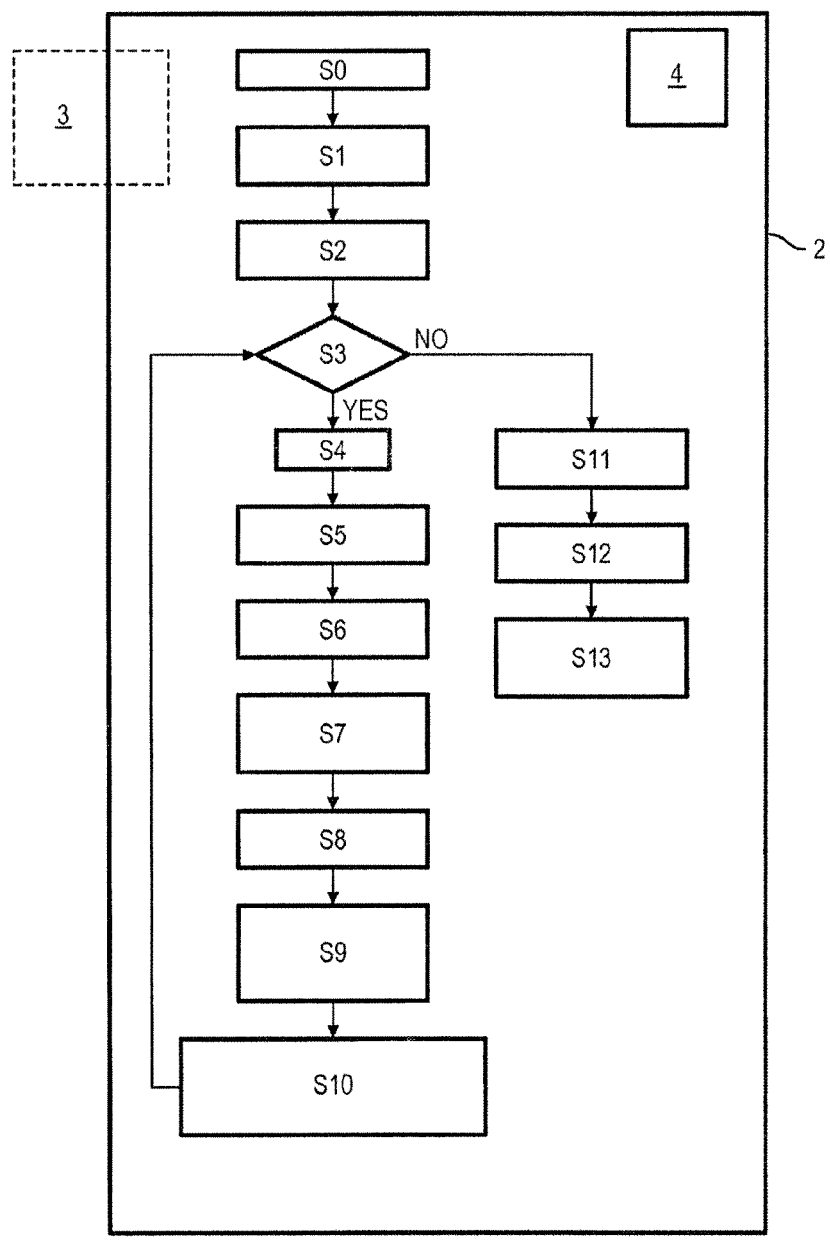
FIG. 1 shows schematically, in a non-temporal fashion, the succession of the main steps of a method according to the invention implemented on a device according to the invention.

The main steps of a method according to the invention are shown in FIGS. 1 to 4.

In this way a method of reading a content 1 on a multimedia device 2 comprising a reader 4 for the content 1 is provided.

In the remainder of the present description, content means any stream of video data and/or one composed of images, with optionally an audio stream, for example a film or a broadcast, to the .mov, .avi, .mp4 (H264), MPEG2, WMA or Divx formats. The examples are given by way of indication and non-limitatively.

The content 1 is supplied to the device 2 from a content server 3, which may be situated at a storage area distant from the device 2 or internal to the device 2. By way of non-limitative example, the server 3 may thus be situated on a hard disk, internal or external to the device 2, or a flash memory, that is to say a memory combining the advantages of random access memories (writing, reading and deletion of blocks of data) and those of read only memories (permanence of the content, even when powered down), or a USB key, that is to say a medium removable from the device 2, containing a flash memory, or a hard minidisk inserted in a USB port of the device. Where the server 3 is not internal to the device, the server may be connected to the device by any type of connection, cable or wireless (GSM, WiFi, Bluetooth, satellite, cable TV or internet http (HyperText Transfer Protocols) for example).

The multimedia device 2 is for example a decoder (or STB), for example TV, cable or satellite, advantageously of the video recorder (PVR or DVR) type or any other device for downloading and/or reading a content 2, such as for example a digital photographic frame, a mobile telephone, a Personal Digital Assistant (PDA), a digital personal stereo, etc. The display of images may take place on a screen of the device 2 (for example Liquid Crystal Display (LCD)), or on a remote screen (for example a television screen connected to the device 2).

The reader 4 is conventionally a hardware and software system for executing multimedia content 1. The reader 4 comprises all the means enabling the device 2 to implement the method according to the invention. The reader 4 thus enables video display of the content and navigation in the content.

For this purpose, the content 1 contains I images intended to be displayed during navigation. The I images, also referred to as "intra" images, are completely independent of the other images normally read, and which are generally coded, in JPEG (Joint Photographic Experts Group) format for example.

The method comprises mainly, when the reader 4 receives, during an initialisation step referenced S0 in FIG. 1, a navigation instruction given by a user, the steps according to which the reader 4:

positions, during a step S5, the reader in the content according to the instruction received, performs the reading only of the I images and, during a step S6, displays an I image according to the reading position;

during a step S7, stops the reading of the content after the display of said I image and effects a continuous display of said image;

calculates, during a step S9, the mean time tm of positioning the reader in the content and of display of the I image; and waits, during a step S10, for a time $t_{wait}$ proportional to the mean time tm before verifying whether a navigation instruction is still given by the user.

Highly advantageously, $$t_{wait}=(k-1)\times tm$$

where k is a constant.

To begin, and as shown by FIGS. 1 to 4, from a normal position of reading the content 1, the user sends a navigation instruction to the reader 4 during an initialisation step S0. The navigation instruction may for example be a fast forward or a fast rewind.

Figure 2:
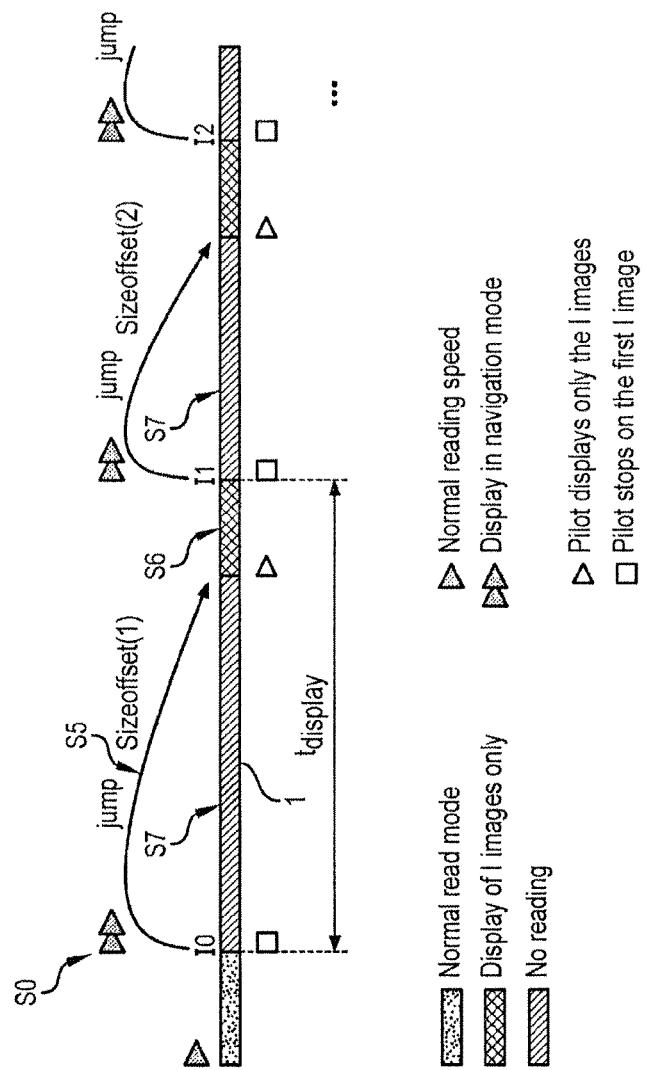
FIG. 2 is a schematic representation in a non-temporal fashion of the implementation of a method according to the invention on a content.
Figure 3:
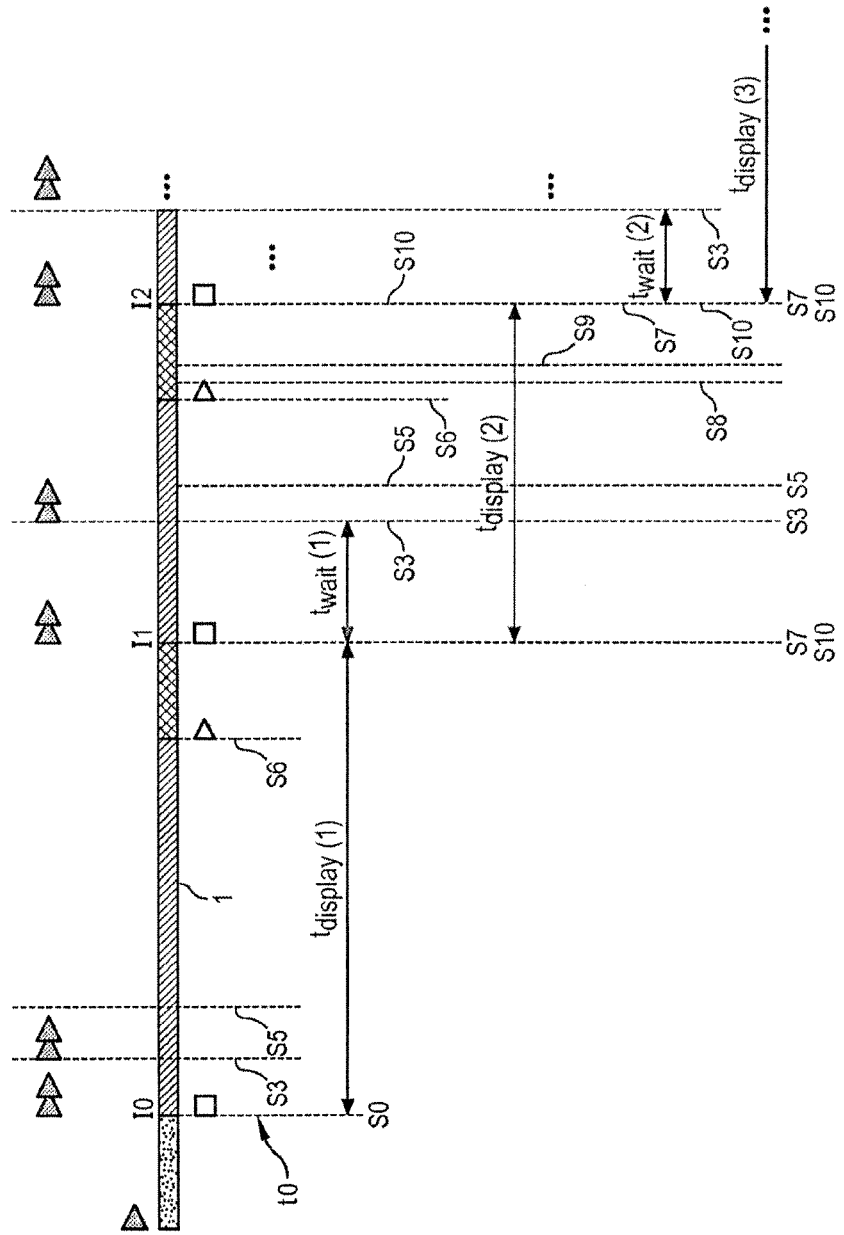
FIG. 3 is schematic representation of the implementation of a method according to the invention.

FIGS. 2 and 3 show for example a fast forward instruction.

During a step S1, the reader 4 stops the synchronisation of the video reading and audio reading of the content 1.

During a step S2, the reader 4 stops the video reading and continuously displays the last image $I_n$, referenced $I_0$ in FIG. 3 for n=0, on the screen associated with the device 2.

During a step S3, the device checks whether navigation mode is still demanded by the user.

If the response is negative, the reader 4 then goes to a step S11 in which the reader reads the content 1 according to normal read mode.

During a step S12, the synchronisation of the video reading and audio reading of the content is re-established.

During a step S13, the reader stops navigation mode.

If the response is positive during step S3, the reader 4 then goes to a step S4, according to which the reader 4 triggers and initialises a counter/chronometer by setting $$t=0.$$

During a step S5, the reader 4 positions the reader in the content 1 according to the instruction received. The instruction is a choice of the user: a navigation speed (×2, ×8, ×32, ×64 or more for example) and a navigation direction (for example fast forward in FIG. 2).

During the positioning at step S5, as shown by FIG. 3 in particular, the image $I_0$ is always displayed on the screen.

Possible examples of determining positioning of the reading in the content 1 are described here.

When the user sends a navigation instruction to the reader 4, the only information supplied is in general the navigation speed.

According the current position in the content and the reference $t_{ref}$, the reader 4 can determine the temporal position where it should place itself in the content 1.

Thus, if $t_n$ is the current position in the content, V the required navigation speed (×4 or ×8 for example), $t_{ref}(n)$ the current reference time, and $t_{n+1}$ the following position in the content, then:

$$t_{n+1} = t_0 \pm V \times t_{ref}(n)$$

The ± depends on the direction of the navigation: + for fast forward and − for fast rewind.

The example in FIG. 3 gives $$t_1 = t_0 + V \times t_{ref}(0)$$

Next, and according to the content 1, the reader 4 determines this position in bytes.

During a positioning by http request or on a hard disk for example, the unit for positioning is the byte, and hence the necessity for a time-byte conversion.

If $t_{n+1}$ is the following position in the content, "rate" the mean rate of the content, then Sizeoffset(n+1), that is to say the position in bytes in the content, can be calculated approximately as follows:

$$\text{Sizeoffset}(n+1) = t_{n+1} \times \text{rate}$$

Thus, in our example with n=0, the reader places itself in a new reading position in the content from $I_0$, making a skip of Sizeoffset(1). $I_0$ is however always displayed on the screen.

After the reader is placed in the new reading position in the content, during step S6, the reader 4 performs the reading only of the I images and displays an image $T_{n+1}$, according to the reading position, namely $I_1$ in FIG. 3.

During step S7, the reader 4 stops the reading of the content after the display of said image $I_{n+1}$ and effects a continuous display of said image $I_{n+1}$.

During a step S8, the time $t_{display}(n+1)$ of positioning (step S5) of the reading in the content and of display (step S6) of the n+1$^{th}$ I image is determined by the counter of the reader and saved by the reader 4. Then $$t = t_{display}(n+1)$$

In our example, the positioning time and the content of step S5 from $I_0$ and the display time of $I_1$ form a time $t_{display}(1)$ as shown in FIG. 3.

During step S9, the reader 4 calculates the mean time tm(n+1) both for positioning (step S5) of the reading in the content and of display (step S6) of the n+1 I images. The reader 4 saves tm(n+1).

Examples of calculation of tm(n+1) are given here.

A first possible calculation of the mean time tm(n+1) after the display of the n+1 first I images is given by the formula:

$$tm(n+1) = \frac{1}{n+1} \sum_{j=1}^{n+1} t_{display}(j)$$

In order to save on resources on the device and avoid keeping the values $t_{display}(n+1)$ in memory for calculation of the mean time tm, a second calculation is possible.

The mean time tm(n+1) can be calculated from the mean time tm(n), without having to keep the values $t_{display}(n+1)$ in the memory of the first n+1 images.

In our example, for calculating the mean time tm(n+1) after the display of the n+1$^{th}$ I image, there is thus the following formula:

$$tm(n+1) = \frac{n}{n+1} \cdot tm(n) + \frac{1}{n+1} \cdot t_{display}(n+1)$$

With n+1 the number of I images already displayed;
tm(n) the mean display time for the first n I images;
tm(n+1) the mean display time for the n+1 I images;
$t_{display}(n+1)$ the positioning and display time of the image $I_{n+1}$.

In our example in FIG. 3, with the first display of $I_1$, this naturally gives according to the two calculations:

$$tm(1) = t_{display}(1)$$

since n=0.

Figure 4:
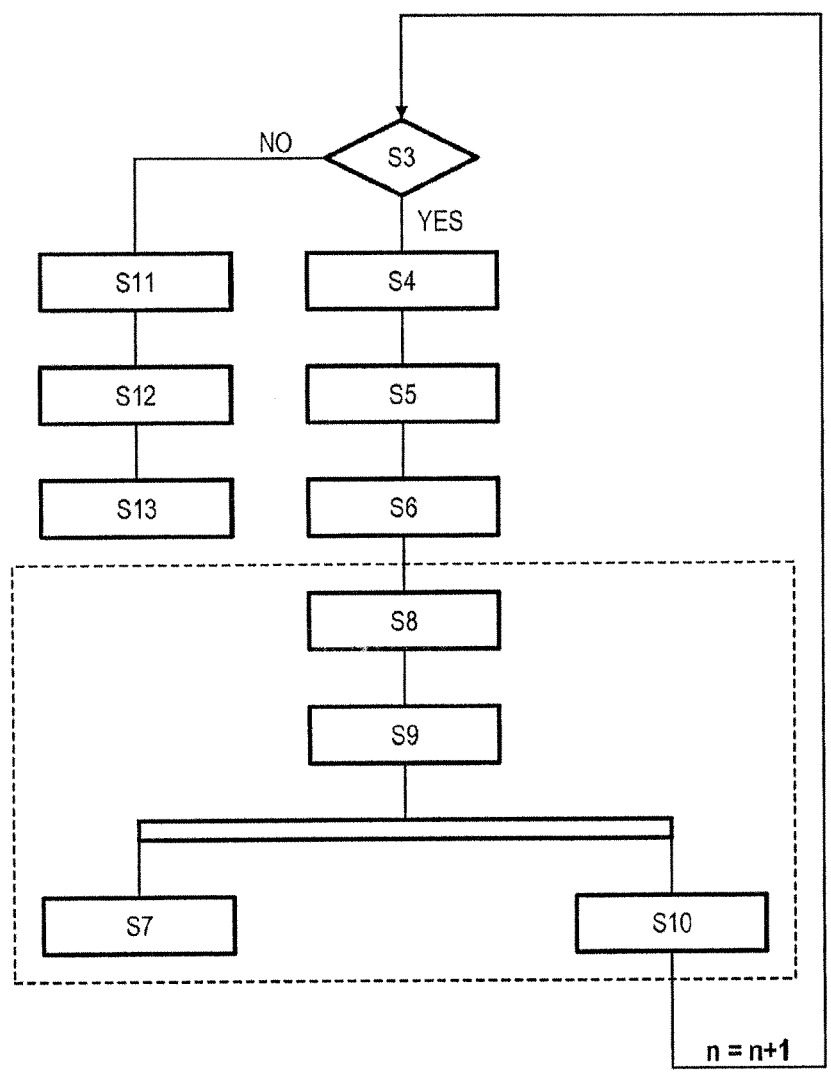
FIG. 4 shows schematically main steps of a method according to the invention implemented on a device according to the invention.

During step S10, after the display of the image n+1 that continues to be made according to step S7 as shown in FIG. 4, the reader 4 waits for a time $t_{wait}(n+1)$ equal to:

$$t_{wait}(n+1) = (k-1) \times tm(n+1)$$

where k is a constant,
before verifying whether a navigation instruction is still having given by the user by returning to step S3 already described.

During this waiting time $t_{wait}(n+1)$, the image $I_{n+1}$ is displayed. Step S7 and step S10 are therefore concomitant.

The waiting time $t_{wait}(n+1)$ allows fluidity of display. Because of the display of the image $I_{n+1}$ during the time $t_{wait}(n+1)$, before verifying whether a navigation instruction is still being given, and consequently advancing in the content, the user has the time to see the current position in the content, which is more pleasant for him.

In our example in FIG. 3, the reader waits for the time $$t_{wait}(1) = (k-1) \times tm(1) = (1/2) \times tm(1)$$

with k=3/2 for example.

As stated, during the time $t_{wait}(1)$, the image $I_1$ is always displayed.

In addition, once the time $t_{wait}(n+1)$ has been calculated by the reader, the reader can also calculate, during step S10 for example, the time $t_{ref}(n+1)$ by the equation:

$$t_{ref}(n+1) = t_{wait}(n+1) + tm(n+1) = k \cdot tm(n+1)$$

In our example in FIG. 3, this thus gives $$t_{ref}(1) = t_{wait}(1) + tm(1) = k \cdot tm(1)$$

The return to step 3 after the waiting time $t_{wait}(n+1)$ takes place by incrementing the variable n by 1 (this then gives in the previously described equations n=n+1)

The developments that follow show an additional occurrence of the cycle of the method, in accordance with FIG. 3.

Thus, during step S3, the reader notes that the fast forward instruction is still being given.

The reader 4 then passes to step S4, of triggering an initialisation of the counter, by posing $$t = 0$$

During step S5, the reader 4 positions the reading in the content 1 according to the instruction received. During the positioning of step S5, the image $I_1$ is always displayed on this screen, as shown by FIG. 3 in particular.

The reader 4 determines the temporal position where it should place itself in the content 1 according to the current position in the content and the reference time $t_{ref}(1)$ (henceforth n=1):

$$t_2 = t_1 + V \times t_{ref}(1)$$

as well as the position in bytes:

$$\text{Sizeoffset}(2) = t_1 \times \text{rate}$$

After the reader has placed the reading position in the content, during step S6, the reader 4 reads only I images and displays an image $I_2$ according to the reading position.

During step S7, the reader 4 stops the reading of the content after the display of said image $I_2$ and effects a continuous display of said image $I_2$.

During a step S8, the time $t_{display}(2)$ of positioning (step S5) the reading in the content and of display (step S6) of the $2^{nd}$ I image is determined by the counter of the reader and saved by the reader 4. Then $$t = t_{display}(2)$$

During step S9, the reader 4 calculates the mean time tm(2) both of positioning (step S5) of the reading in the content and of display (step S6) of the two I images.

Preferentially, the mean time tm(2) can be calculated from the mean time tm(1):

$$tm(2) = \frac{1}{2} \cdot tm(1) + \frac{1}{2} \cdot t_{display}(2)$$

The reader 4 saves tm(2).

During step S10, after the display of the image $I_2$, the reader 4 waits for a time $t_{wait}(2)$ equal to:

$$t_{wait}(2) = (1/2) \times tm(2)$$

since k=3/2, before verifying whether a navigation instruction is still being given by the user by returning to step S3 already described, with this time n=2, and so on.

During this waiting time $t_{wait}(2)$, the image $I_2$ is displayed.

During step S10, the reader calculates $t_{ref}(2)$:

$$t_{ref}(2) = t_{wait}(2) + tm(2) = (3/2) \cdot tm(2)$$

In the above developments, k is a constant to be fixed, depending on whether a very regular navigation with fewer images is required, or a navigation with the most images possible but which risks being less regular.

In practice, k=3/2 seems to be a value that provides the compromise of displaying many images with a display rate that remains regular.

The reference time $t_{ref}$ being proportional to the means display time tm, the frequency of display takes into account the type of content and the reading parameters (network, bandwidth for example).

The invention claimed is:

1. Method of reading a content on a multimedia device comprising a reader of the content, the reader also enabling video display of the content and navigation in the content, the content containing I images intended to be displayed during navigation, the method comprising, when the reader receives a navigation instruction given by a user, the steps according to which the reader:
   positions (S5) the reader in the content according to the instruction received,
   performs the reading only of the I images and displays (S6) an image $I_n$ according to the reading position;
   stops the reading of the content after he display of said image $I_n$ and effects a continuous display of said image (S7);
   calculates (S9) a mean time tm(n)
      of positioning (S5) the reading in the content and
      of display (S6) of the image $I_n$;
   waits (S10) for a time $t_{wait}(n)$ proportional to the mean time tm(n), before verifying whether a navigation instruction is still being given by the user.

2. Method according to claim 1, in which the time $t_{wait}(n)$ is equal to:

$$t_{wait}(n) = (k-1) \times tm(n)$$

where k is a constant.

3. Method according to claim 2, in which the reader calculates a reference time $t_{ref}(n)$ after the display of the image $I_n$ by means of the equation:

$$t_{ref}(n) = t_{wait}(n) = tm(n) + tm(n) = k \cdot tm(n).$$

4. Method according to claim 1, in which the reader calculates the mean time tm(n+1) of the time obtained after the display of the first n+1 I images by means of the equation:

$$tm(n+1) = \frac{1}{n+1} \sum_{j=1}^{n+1} t_{display}(j)$$

with $t_{display}(j)$ the time for positioning and displaying each image j.

5. Method according to claim 1, in which the reader calculates the mean time tm(n+1) obtained after the display of the image $n_{+1}$ by means of the equation:

$$tm(n+1) = \frac{n}{n+1} \cdot tm(n) + \frac{1}{n+1} \cdot t_{display}(n+1)$$

with n+1 the number of I images displayed;
tm(n) the mean display time for the first n images;
tm(n+1) the mean display time for the n+1 images;
$t_{display}(n+1)$ the positioning and display time of the image $n_{+1}$.

6. Method according to claim 3, in which the reader determines the following temporal position where it is to place itself in the content by means of the equation:

$$t_{n+1} = t_n \pm V \times t_{ref}(n)$$

where $t_{n+1}$ is the following position in the content,
$t_n$ is the current position in the content,
V is the required speed of the navigation,
$t_{ref}(n)$ is the reference time, and
± depends on the direction of the navigation: + for fast forward and − for fast rewind.

7. Method according to claim 2, in which k is equal to 3/2.

8. Multimedia device comprising a reader for multimedia content suitable for implementing a method according to claim 1.

9. Device according to claim 8, in which the reader is suitable for reading contents of the DVB, .mov, .avi, .mp4 (H264), MPEG2, WMA or Divx type.

10. Device according to claim 8, of the TV decoder type, by cable or satellite, advantageously of the video recorder type.

11. Device according to claim 9, of the TV decoder type, by cable or satellite, advantageously of the video recorder type.

12. Method according to claim 2, in which the reader calculates the mean time tm(n+1) of the time obtained after the display of the first $n_{+1}$ I images by means of the equation:

$$tm(n+1) = \frac{1}{n+1}\sum_{j=1}^{n+1} t_{display}(j)$$

with $t_{display}(j)$ the time for positioning and displaying each image j.

13. Method according to claim 3, in which the reader calculates the mean time tm(n+1) of the time obtained after the display of the first n+1 I images by means of the equation:

$$tm(n+1) = \frac{1}{n+1}\sum_{j=1}^{n+1} t_{display}(j)$$

with $t_{display}(j)$ the time for positioning and displaying each image j.

14. Method according to claim 2, in which the reader calculates the mean time tm(n+1) obtained after the display of the image n+1 by means of the equation:

$$tm(n+1) = \frac{n}{n+1}\cdot tm(n) + \frac{1}{n+1}\cdot t_{display}(n+1)$$

with n+1 the number of I images displayed;
tm(n) the mean display time for the first n images;
tm(n+1) the mean display time for the n+1 images;
$t_{display}(n+1)$ the positioning and display time of the image n+1.

15. Method according to claim 3, in which the reader calculates the mean time tm(n+1) obtained after the display of the image n+1 by means of the equation:

$$tm(n+1) = \frac{n}{n+1}\cdot tm(n) + \frac{1}{n+1}\cdot t_{display}(n+1)$$

with n+1 the number of I images displayed;
tm(n) the mean display time for the first n images;
tm(n+1) the mean display time for the n+1 images;
$t_{display}(n+1)$ the positioning and display time of the image n+1.

16. Method according to claim 4, in which the reader determines the following temporal position where it is to place itself in the content by means of the equation:

$$t_{n+1} = t_n \pm V \times t_{ref}(n)$$

where $t_{n+1}$ is the following position in the content,
$t_n$ is the current position in the content,
V is the required speed of the navigation,
$t_{ref}(n)$ is the reference time, and
± depends on the direction of the navigation: + for fast forward and − for fast rewind.

17. Method according to claim 5, in which the reader determines the following temporal position where it is to place itself in the content by means of the equation:

$$t_{n+1} = t_n \pm V \times t_{ref}(n)$$

where $t_{n+1}$ is the following position in the content,
$t_n$ is the current position in the content,
V is the required speed of the navigation,
$t_{ref}(n)$ is the reference time, and
± depends on the direction of the navigation: + for fast forward and − for fast rewind.

18. Method according to claim 3, in which k is equal to 3/2.

* * * * *

UNITED STATES PATENT AND TRADEMARK OFFICE
CERTIFICATE OF CORRECTION

PATENT NO. : 8,718,453 B2
APPLICATION NO. : 13/393535
DATED : May 6, 2014
INVENTOR(S) : Pierre Melia It is certified that error appears in the above-identified patent and that said Letters Patent is hereby corrected as shown below:

In the Claims,

Column 7, Claim 1, line 62, please delete "he" and insert --the--.

Column 8, Claim 3, line 14, please delete "$t_{ref}(n)=t_{wait}(n)= tm(n)+tm(n)=k \cdot tm(n)$" and insert --$t_{ref}(n)=t_{wait}(n) + tm(n)=k \cdot tm(n)$--.

Signed and Sealed this
Thirteenth Day of January, 2015

Michelle K. Lee
*Deputy Director of the United States Patent and Trademark Office*